United States Patent
Ording et al.

(10) Patent No.: US 8,413,075 B2
(45) Date of Patent: Apr. 2, 2013

(54) GESTURE MOVIES

(75) Inventors: Bas Ording, San Francisco, CA (US); Steven P. Jobs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 12/242,654

(22) Filed: Sep. 30, 2008

(65) Prior Publication Data

US 2009/0178011 A1 Jul. 9, 2009

Related U.S. Application Data

(60) Provisional application No. 61/019,223, filed on Jan. 4, 2008.

(51) Int. Cl.
*G06F 3/033* (2006.01)
*G06F 3/048* (2006.01)
*G06F 3/00* (2006.01)

(52) U.S. Cl. .......................... 715/863; 715/809; 715/730

(58) Field of Classification Search .................. 715/863, 715/809, 730
See application file for complete search history.

(56) References Cited

U.S. PATENT DOCUMENTS

| | | |
|---|---|---|
| 5,236,199 A | 8/1993 | Thompson, Jr. |
| 5,252,951 A | 10/1993 | Tannenbaum et al. |
| 5,379,057 A | 1/1995 | Clough et al. |
| 5,473,705 A | 12/1995 | Abe et al. |
| 5,483,261 A | 1/1996 | Yasutake |
| 5,488,204 A | 1/1996 | Mead et al. |
| 5,528,743 A | 6/1996 | Tou et al. |
| 5,596,698 A | 1/1997 | Morgan |
| 5,675,362 A | 10/1997 | Clough et al. |
| 5,689,575 A | 11/1997 | Sako et al. |
| 5,734,923 A | 3/1998 | Sagawa et al. |
| 5,741,136 A | 4/1998 | Kirksey et al. |
| 5,791,351 A | 8/1998 | Curchod |
| 5,825,352 A | 10/1998 | Bisset et al. |
| 5,835,079 A | 11/1998 | Shieh |
| 5,880,411 A | 3/1999 | Gillespie et al. |
| 6,116,907 A | 9/2000 | Baker et al. |
| 6,147,678 A | 11/2000 | Kumar et al. |

(Continued)

FOREIGN PATENT DOCUMENTS

| | | |
|---|---|---|
| EP | 0 689 124 A1 | 12/1995 |
| JP | 7-146750 A | 6/1995 |

(Continued)

OTHER PUBLICATIONS

Anonymous. (2005). "Mouse Emulation—Gesture Guide," FingerWorks, located at <http://www.fingerworks.com/gesture_guide_mouse.html>, last visited Sep. 4, 2008, one page.

(Continued)

*Primary Examiner* — David Phantana Angkool
(74) *Attorney, Agent, or Firm* — Morrison & Foerster LLP

(57) ABSTRACT

The display of gesture movies is disclosed to assist users in performing gestures. Gesture movies can be short, unintrusive, and available on demand. A list box can appear in a pop-up window or preference panel, containing a list of gestures that can be displayed. If a user clicks on a gesture in the list, a video, movie or animation of the gesture being performed appears in one box, and a video, movie or animation of the action being performed on a particular object is displayed in another box. Thus, a hand can be shown performing the selected gesture over a touch sensor panel, while at the same time, and synchronized with the gesture being displayed, an object being manipulated by the gesture is displayed.

28 Claims, 5 Drawing Sheets

U.S. PATENT DOCUMENTS

| | | |
|---|---|---|
| 6,162,189 A | 12/2000 | Girone et al. |
| 6,181,778 B1 | 1/2001 | Ohki et al. |
| 6,188,391 B1 | 2/2001 | Sealy et al. |
| 6,268,857 B1 | 7/2001 | Fishkin et al. |
| 6,297,838 B1 | 10/2001 | Chang et al. |
| 6,310,610 B1 | 10/2001 | Beaton et al. |
| 6,323,846 B1 | 11/2001 | Westerman et al. |
| 6,337,678 B1 | 1/2002 | Fish |
| 6,535,204 B2 * | 3/2003 | Sun .................. 345/173 |
| 6,594,616 B2 | 7/2003 | Zhang et al. |
| 6,690,387 B2 | 2/2004 | Zimmerman et al. |
| 7,015,894 B2 | 3/2006 | Morohoshi |
| 7,030,861 B1 | 4/2006 | Westerman et al. |
| RE39,090 E * | 5/2006 | Beauregard et al. ......... 1/1 |
| 7,184,064 B2 | 2/2007 | Zimmerman et al. |
| 7,249,950 B2 | 7/2007 | Freeman et al. |
| RE40,153 E * | 3/2008 | Westerman et al. ......... 345/173 |
| 7,603,633 B2 * | 10/2009 | Zhao et al. ............ 715/863 |
| RE40,993 E * | 11/2009 | Westerman ........... 345/173 |
| 7,631,320 B2 * | 12/2009 | Stern et al. ............ 719/329 |
| 7,653,883 B2 * | 1/2010 | Hotelling et al. ........ 715/863 |
| 7,663,607 B2 | 2/2010 | Hotelling et al. |
| 7,668,340 B2 * | 2/2010 | Cohen et al. ............ 382/103 |
| 7,721,264 B2 * | 5/2010 | Peterson et al. ......... 717/125 |
| 7,840,912 B2 | 11/2010 | Elias et al. |
| 7,895,537 B2 * | 2/2011 | Gruen et al. ............ 715/863 |
| 7,907,141 B2 * | 3/2011 | Saund ............. 345/468 |
| 7,911,456 B2 * | 3/2011 | Gillespie et al. ......... 345/174 |
| 7,991,401 B2 * | 8/2011 | Linder et al. ........... 455/438 |
| 8,219,937 B2 * | 7/2012 | Coddington ............ 715/863 |
| 2002/0107556 A1 | 8/2002 | Mcloul et al. |
| 2002/0140718 A1 | 10/2002 | Yan et al. |
| 2003/0191779 A1 * | 10/2003 | Sagawa et al. .......... 707/104.1 |
| 2003/0222917 A1 | 12/2003 | Trantow |
| 2004/0168149 A1 * | 8/2004 | Nirell et al. ............ 717/105 |
| 2004/0189720 A1 | 9/2004 | Wilson et al. |
| 2004/0193413 A1 | 9/2004 | Wilson et al. |
| 2005/0057524 A1 | 3/2005 | Hill et al. |
| 2005/0210417 A1 | 9/2005 | Marvit et al. |
| 2005/0210418 A1 | 9/2005 | Marvit et al. |
| 2005/0212755 A1 | 9/2005 | Marvit |
| 2006/0026521 A1 | 2/2006 | Hotelling et al. |
| 2006/0026535 A1 | 2/2006 | Hotelling et al. |
| 2006/0087510 A1 | 4/2006 | Adamo-Villani et al. |
| 2006/0097991 A1 | 5/2006 | Hotelling et al. |
| 2006/0101354 A1 | 5/2006 | Hashimoto et al. |
| 2006/0125803 A1 | 6/2006 | Westerman et al. |
| 2006/0134585 A1 | 6/2006 | Adamo-Villani et al. |
| 2006/0197753 A1 | 9/2006 | Hotelling |
| 2006/0209014 A1 | 9/2006 | Duncan et al. |
| 2006/0209041 A1 | 9/2006 | Studt et al. |
| 2006/0287617 A1 | 12/2006 | Taub et al. |
| 2007/0177803 A1 | 8/2007 | Elias et al. |
| 2007/0177804 A1 | 8/2007 | Elias et al. |
| 2008/0089587 A1 | 4/2008 | Kim et al. |
| 2008/0158168 A1 | 7/2008 | Westerman et al. |
| 2008/0158172 A1 | 7/2008 | Hotelling et al. |
| 2008/0163130 A1 * | 7/2008 | Westerman ........... 715/863 |
| 2008/0191864 A1 | 8/2008 | Wolfson |
| 2009/0178011 A1 | 7/2009 | Ording et al. |
| 2009/0197615 A1 * | 8/2009 | Kim et al. ............ 455/456.1 |
| 2009/0217211 A1 | 8/2009 | Hildreth et al. |
| 2009/0228841 A1 | 9/2009 | Hildreth |
| 2010/0031202 A1 * | 2/2010 | Morris et al. .......... 715/863 |
| 2010/0031203 A1 | 2/2010 | Morris et al. |
| 2010/0134308 A1 | 6/2010 | Barnardo et al. |
| 2010/0162181 A1 | 6/2010 | Shiplacoff et al. |
| 2010/0164891 A1 | 7/2010 | Hill et al. |
| 2012/0192108 A1 * | 7/2012 | Kolb ............. 715/810 |

FOREIGN PATENT DOCUMENTS

| | | |
|---|---|---|
| JP | 2000-163031 A | 6/2000 |
| JP | 2002-259046 A | 9/2002 |
| JP | 2002-342033 A | 11/2002 |
| JP | 2005-293061 A | 10/2005 |
| WO | WO-2006/094308 A2 | 9/2006 |
| WO | WO-2006/094308 A3 | 9/2006 |
| WO | WO-2008/085783 A1 | 7/2008 |
| WO | WO-2008/085784 A2 | 7/2008 |

OTHER PUBLICATIONS

Anonymous. (2005). "MyGesture Editor—Gesture Mapping," located at <http://www.fingerworks.com/MyGestureEditor_mapping.html>, last visited Jan. 8, 2009, five pages.

Anonymous. (Nov. 26, 2005). "MyGesture Editor—Gesture Mapping," located at <http://web/archive.org.web/20051126023354/http://www.fingerworks.com/MyGestureEditor_mapping.html>, last visited Jan. 8, 2009, four pages.

Final Office Action mailed Jan. 8, 2010, for U.S. Appl. No. 11/619,553, filed Jan. 3, 2007, 34 pages.

International Search Report mailed May 14, 2008, for PCT Application No. PCT/US2007/089159, filed Dec. 28, 2007, two pages.

International Search Report mailed Jan. 29, 2009, for PCT Application No. PCT/US2007/089161, filed Dec. 28, 2007, four pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Apr. 2, 2009, for U.S. Appl. No. 11/619,553, filed Jan. 3, 2007, 41 pages.

Non-Final Office Action mailed Apr. 27, 2010, for U.S. Appl. No. 11/619,571, filed Jan. 3, 2007, 20 pages.

Non-Final Office Action mailed Oct. 4, 2010, for U.S. Appl. No. 11/619,571, filed Jan. 3, 2007, 19 pages.

Non-Final Office Action mailed Feb. 4, 2011, for U.S. Appl. No. 11/763,908, filed Jun. 15, 2007, 10 pages.

Notice of Allowance mailed Jul. 9, 2010, for U.S. Appl. No. 11/619,553, filed Jan. 3, 2007, eight pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Jul. 8, 2011, for U.S. Appl. No. 11/763,908, filed Jun. 15, 2007, eight pages.

Final Office Action mailed Jul. 18, 2012, for U.S. Appl. No. 11/763,908, filed Jun. 15, 2007, nine pages.

Final Office Action mailed Apr. 9, 2012, for U.S. Appl. No. 11/619,571, filed Jan. 3, 2007, 22 pages.

Non-Final Office Action mailed Mar. 26, 2012, for U.S. Appl. No. 11/763,908, filed Jun. 15, 2007, nine pages.

Non-Final Office Action mailed Sep. 23, 2011, for U.S. Appl. No. 11/619,571, filed Jan. 3, 2007, 22 pages.

Non-Final Office Action mailed Dec. 19, 2011, for U.S. Appl. No. 11/763,908, filed Jun. 15, 2007, eight pages.

\* cited by examiner

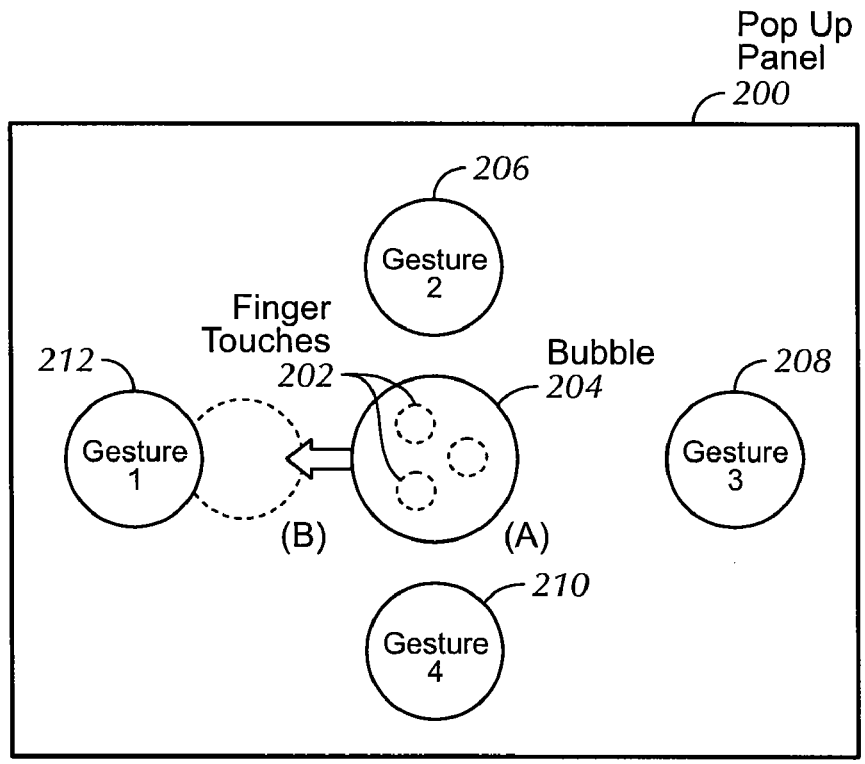
*FIG. 2*
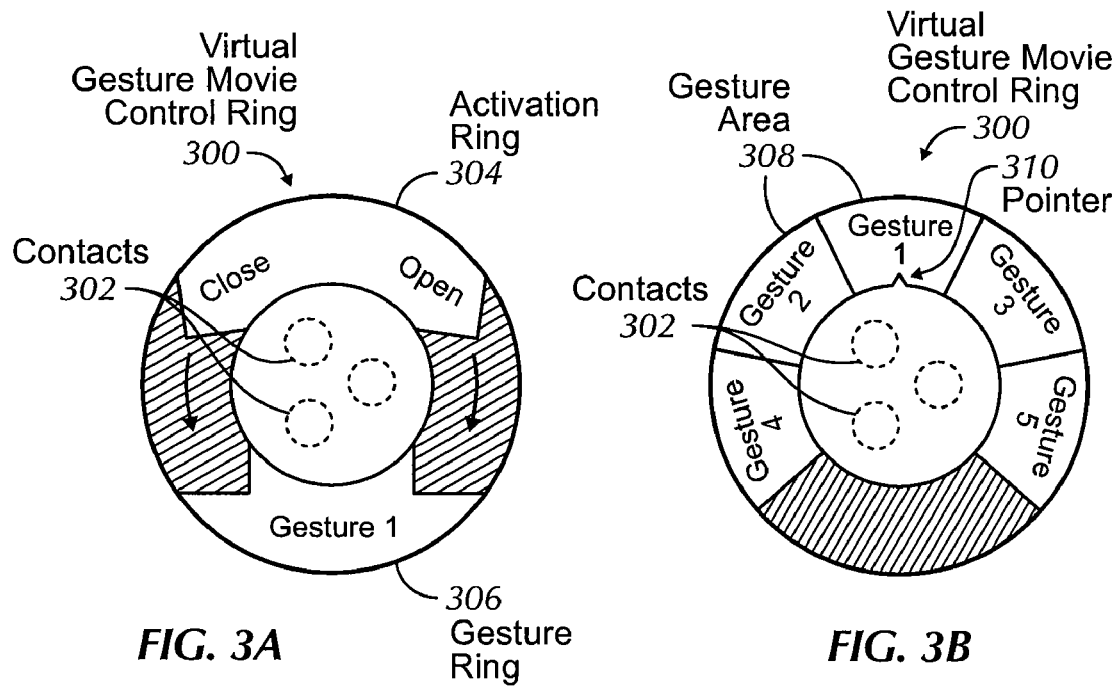
*FIG. 3A*    *FIG. 3B*

GESTURE MOVIES

CROSS-REFERENCE TO RELATED APPLICATIONS

This application claims the benefit of U.S. Provisional Patent Application No. 61/019,223 filed on Jan. 4, 2008, the contents of which are incorporated herein by reference in their entirety for all purposes.

FIELD OF THE INVENTION

This relates generally to input devices for computing systems, and more particularly, to the display of gesture movies to aid a user in performing gestures on an input device such as a trackpad.

BACKGROUND OF THE INVENTION

Many types of input devices are presently available for performing operations in a computing system, such as buttons or keys, mice, joysticks, trackballs, trackpads, touch screens and the like. Touch screens can include a touch sensor panel, which can be a clear panel with a touch-sensitive surface. The touch sensor panel can be positioned in front of a display screen so that the touch-sensitive surface covers part of all of the viewable area of the display screen. Touch screens can allow a user to make selections and move a cursor by simply touching the display screen via one or more fingers or a stylus. In general, touch screens can recognize the touch and position of the touch on the display screen, and a computing system can interpret the touch and thereafter perform an action based on the touch event. Trackpads can also include a touch sensor panel, but the panel need not be transparent because no display screen is involved.

With touch screens and trackpads as described above, a number of gestures can be recognized by a computing system processing the obtained images of touch. However, it can be difficult for a user to remember the gestures that can be performed, particularly if the available gestures are dependent on the application being executed.

SUMMARY OF THE INVENTION

This relates to the display of gesture movies to assist users in performing gestures. Gesture movies can be short, unintrusive, and available on demand. A list box can appear in a pop-up window or preference panel containing a list of gestures that can be demonstrated. If a user clicks on a gesture in the list, a video, movie or animation of the gesture being performed can appear in one box, while a video, movie or animation of the action being performed on a particular object can be displayed in another box. Thus, for example, a hand can be shown performing the selected gesture over a touch sensor panel, while at the same time, and synchronized with the gesture being displayed, an object being manipulated by the gesture can be displayed. The object displayed while the gesture is being performed can be predetermined, or it can be a function of the gesture and/or context in which the demonstration is invoked.

If the gesture movie is an animation, a hand can be shown performing the gesture, with dots, outlines or other indicators indicating the touch points of the fingers on the touch sensor panel. In some embodiments, the hand can then fade out, leaving only the dots remaining to show the gestures being performed. In other embodiments, arrows can appear, disappear, move, grow, shrink, or otherwise appear in other animated ways to indicate the direction and order that fingers or palms should move, and audio may accompany the video or animations, including but not limited to finger touchdown sounds, explanations of the gesture being performed, and the like. Other options would be to light up the area of finger touchdowns, create a "water ripple" effect to show finger touchdowns, or show side or perspective views of the hand in additional boxes to show when the fingers actually touch down.

A user could possibly start a gesture by touching fingers down on a touch sensor panel, and then pause or "freeze up," not remembering the particular gesture for a given application. In this case, another embodiment of the invention can have the preference panel and a particular gesture movie (video or animation) such as those described above pop up automatically if a touchdown accompanied by a freeze in motion is detected, the video or animation showing how to complete the gesture for that particular application. A motion freeze can be defined in terms of the contact points having movement below a certain threshold for a predetermined amount of time. The particular gesture movie that appears automatically can be a gesture whose starting positions most closely match the fingers or objects touching down on the touch sensor panel. In some embodiments, the displayed gesture movie can reflected the apparent "handedness" of the touchdown points. In other words, if the touchdown points suggest a left hand, the displayed gesture movie can feature a left hand performing the gesture.

For touch screens such as those on handheld devices, there may not be the luxury of having separate boxes for a list of gestures, the gesture itself, and an object being manipulated by the gesture. Therefore, a list box of gestures can first appear on the touch screen. After the user has selected a gesture from the list, the list box can be replaced with a gesture movie. Because important user interface (UI) features of the object being manipulated may be hidden under the gesture being performed, a semi-transparent hand can appear over the touch screen, with the object being manipulated visible under the hand.

BRIEF DESCRIPTION OF THE DRAWINGS

FIG. 2 illustrates an exemplary popup panel that can appear automatically when finger touchdowns are detected followed by a freeze in motion according to one embodiment of this invention.

FIG. 3a illustrates an exemplary virtual gesture movie control ring according to one embodiment of this invention.

FIG. 3b illustrates another exemplary virtual gesture movie control ring according to embodiments of the invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the display of gesture movies to assist users in performing gestures. Gesture movies can be short, unintrusive, and available on demand. A list box can appear in a pop-up window or preference panel, containing a list of gestures that can be demonstrated. If a user clicks on a gesture in the list, a movie (e.g. a video or animation) of the gesture being performed can appears in one box, while a movie (e.g. a video or animation) of the action being performed on a particular object can be displayed in another box. Thus, a hand can be shown performing the selected gesture over a touch sensor panel, while at the same time, and synchronized with the gesture being displayed, an object being manipulated by the gesture can be displayed.

Figure 1A:
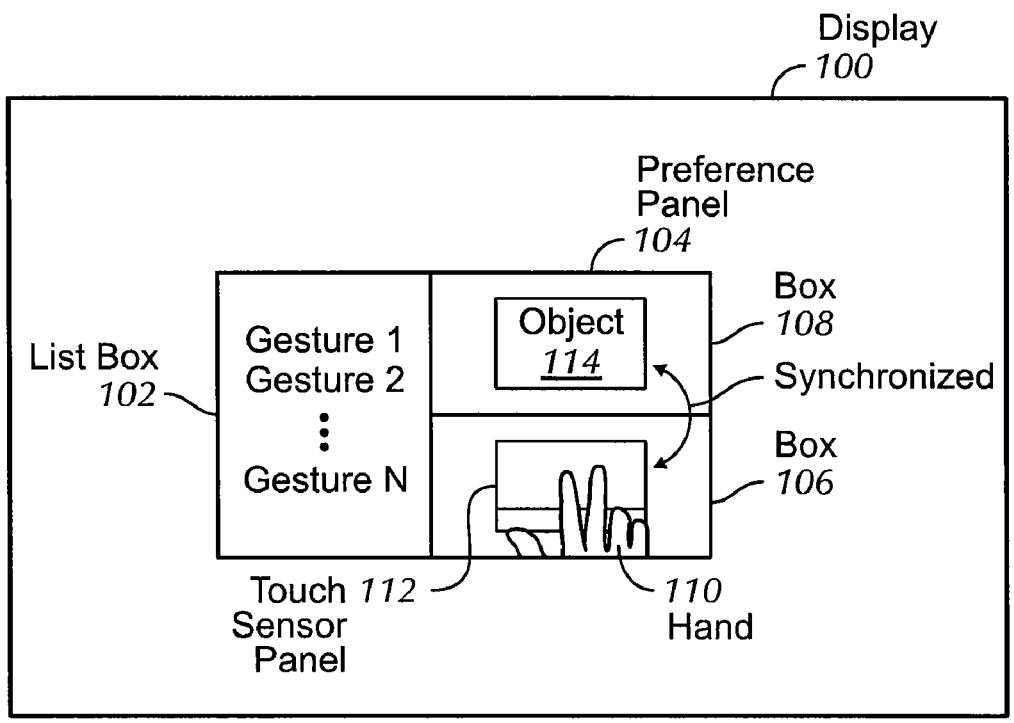
FIG. 1a illustrates a display showing an exemplary preference panel including a gesture movie according to one embodiment of this invention.

FIG. 1a illustrates a display 100 showing an exemplary gesture movie according to embodiments of the invention. In the example of FIG. 1, a list box 102 can appear in a pop-up window or preference panel 104 containing a list of gestures that can be displayed. The preference panel 104 can be called up manually by a user, or can pop up automatically as described in other embodiments below. If a user clicks on a gesture in the list 102, a movie (e.g. video or animation) of the gesture being performed can appear at 106, and a movie (e.g. video or animation) of the action being performed on a particular object can be displayed at 108. Thus, box 106 can show an actual hand 110 (including one or more fingers and optionally a palm) performing the selected gesture over a touch sensor panel 112, while at the same time, and synchronized with the gesture being displayed, an object 114 being manipulated by the gesture can be displayed. For example, if the gesture is a simple two-finger zoom out gesture, while box 106 shows two fingers spreading apart, box 108 can show a map being zoomed out.

The object displayed while the gesture is being performed can be predetermined, or it can be a function of the gesture and/or context in which the demonstration is invoked. For example, if the preference panel is invoked, either manually by the user or automatically while an image such as a photo is being displayed, the object may be a smaller version of the actual image being displayed, or in other embodiments it could be a sample image. In another example, if the preference panel is invoked while a list is being displayed, the object may be a smaller version of the actual list being displayed, or in other embodiments it could be a sample list. In yet another example, if the preference panel is invoked while a desktop of icons is being displayed, the object may be a smaller version of the actual desktop being displayed, or in other embodiments it could be a desktop of representative icons. In contrast, if a zoom gesture is selected for demonstration while a list is being displayed, because the zoom gesture may be incompatible with a list (i.e. lists are generally not subjected to zooming in or out), the object manipulated may not be a list, but rather a representative image.

Figure 1B:
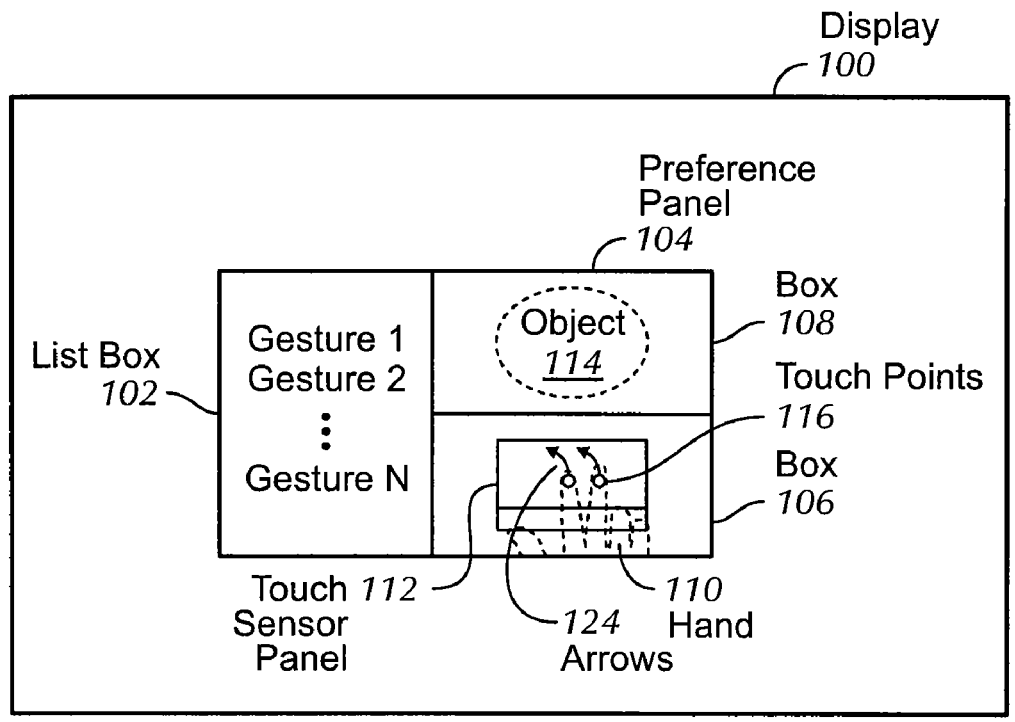
FIG. 1b illustrates a display showing an alternative exemplary gesture movie according to one embodiment of this invention.

FIG. 1b illustrates the display 100 showing an alternative exemplary gesture movie according to embodiments of the invention. In the example of FIG. 1b, box 106 can show a hand 110 performing the gesture, with dots, outlines or other indicators 116 indicating the touch points of the fingers on the touch sensor panel 112. In some embodiments, the hand can then fade out, leaving only the dots remaining to show the gestures being performed. In other embodiments, arrows 124 can appear, disappear, move, grow, shrink, or otherwise appear in other animated ways to indicate the direction and order that fingers or palms should move. In other embodiments, audio 118 may accompany the video or animations, including but not limited to finger touchdown sounds, explanations of the gesture being performed, and the like. Other options would be to light up the area of finger touchdowns, create a "water ripple" effect to show finger touchdowns, or show side or perspective views of the hand in additional boxes to show when the fingers actually touch down.

In other embodiments, if the gesture preference panel is not removed, the panel can automatically cycle through the entire list of gestures, playing the movie of the gesture and showing an application of the gesture in boxes 106 and 108. Alternatively, the same selected gesture can be cycled through repeatedly.

Because different touches and gestures can mean different things in different applications, a user could possibly start a gesture by touching fingers down on a touch sensor panel, and then pause or "freeze up," not remembering the particular gesture for that application. In this case, another embodiment of the invention can have the preference panel and a particular gesture movie (video or animation) such as those described above with respect to FIGS. 1a and 1b pop up automatically if a touchdown accompanied by a freeze in motion is detected, the video or animation showing how to complete the gesture for that particular application. A motion freeze can be defined in terms of the contact points having movement below a certain threshold for a predetermined amount of time. The particular gesture movie that appears automatically can be a gesture whose starting positions most closely match the fingers or objects touching down on the touch sensor panel. In some embodiments, the displayed gesture movie can reflected the apparent "handedness" of the touchdown points. In other words, if the touchdown points suggest a left hand, the displayed gesture movie can feature a left hand performing the gesture.

Because a number of gestures may start from the same or similar pattern of contacts touching down on the touch sensor panel, in some embodiments the pop-up preference panel may cycle through the possible gestures for the detected pattern of contacts. In alternative embodiments, the user may be forced to continue the gesture just long enough until firmware can determine a particular gesture movie to show. In other embodiments, the list box may display a list of possible gestures corresponding to the detected contacts, and the user can then select a gesture from the list. In still other embodiments, the particular gesture of interest can be selected as described below.

FIG. 2 illustrates an exemplary popup panel 200 that can appear automatically when finger touchdowns are detected followed by a freeze or pause in motion according to embodiments of the invention. At the center is the detected finger touches 202, with a bubble 204 formed around the finger touches. Surrounding bubble 204 are other bubbles 206, 208, 210 and 212 indicating possible gestures that start with the detected finger touches. Each bubble 206, 208, 210 and 212 can provide an indication (e.g. text or graphic) of a gesture that could be performed using the detected finger touches. If the user moves his fingers from location (A) to (B) so that bubble 204 follows the contacts and pushes against bubble 212, for example, that bubble can light up or provide some other indication that it has been selected. When the user stops touching the touch sensor panel, a gesture movie associated with bubble 212 can start playing as described above. Although FIG. 2 illustrates bubbles, it should be understood that other shapes or user interface arrangements capable of allowing users to slide their fingers to different areas to select a particular gesture can be employed.

FIG. 3a illustrates an exemplary virtual gesture movie control ring 300 according to embodiments of the invention. In the example of FIG. 3a, virtual gesture movie control ring 300 appears around contact points 302 when a finger touch-down is detected. On the perimeter of virtual gesture movie control ring 300 can be gesture movie activation ring 304 and a gesture ring 306, the gesture movie activation ring having an "open" end and a "close" end. By rotating the user's fingers until either the open end or the close end of ring 304 touches ring 306, a gesture movie associated with the gesture ring 306 can either be made to appear or disappear. Thus, at any point in time, a user can touch fingers down on a certain area of a touch sensor panel and call up a gesture movie associated with the particular finger touches.

FIG. 3b illustrates another exemplary virtual gesture movie control ring 300 according to embodiments of the invention. In the example of FIG. 3b, the perimeter of virtual gesture movie control ring 300 may contain different areas 308, one area for each possible gesture that may be performed from the detected starting position. A user can rotate the contact points and move pointer 310 until a particular gesture is selected for display. Thus, FIG. 3b is an alternative to FIG. 2 in that in allows for selection of a particular gesture by rotation rather than sliding.

Figure 4:
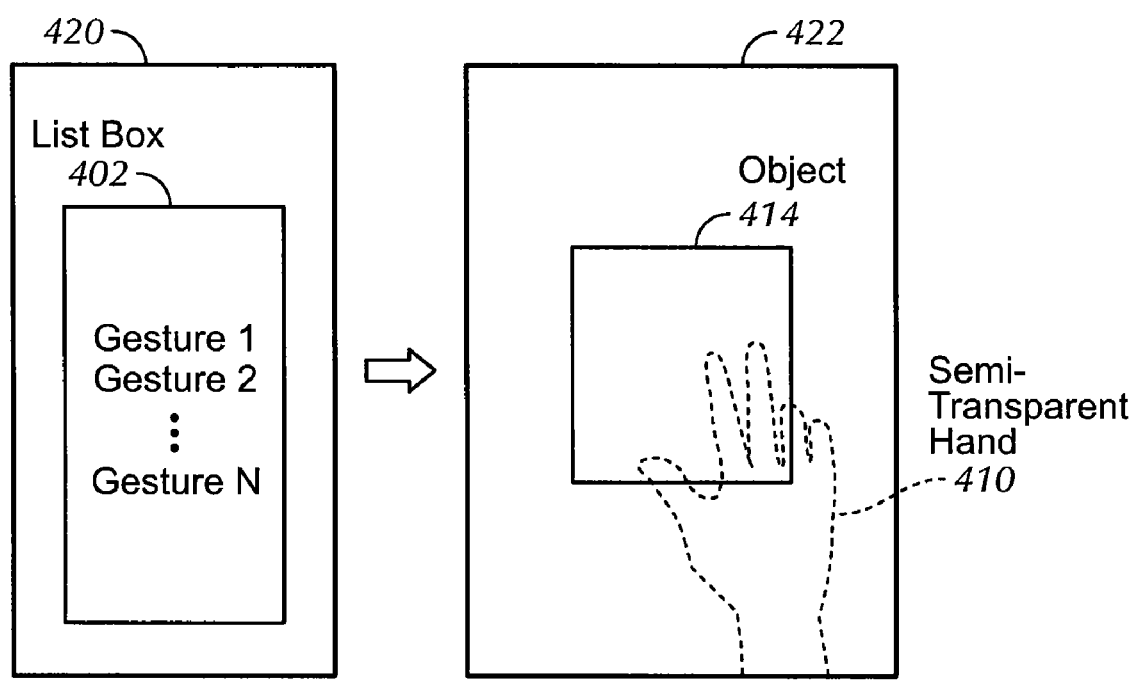
FIG. 4 illustrates an exemplary touch screen showing gesture movies according to one embodiment of this invention.

FIG. 4 illustrates an exemplary touch screen showing gesture movies according to embodiments of the invention. For touch screens such as those on handheld devices, there may not be the luxury of having separate boxes for a list of gestures, the gesture itself, and an object being manipulated by the gesture. Therefore, in the example of FIG. 4, a list box 402 of gestures can first appear on the touch screen at 420. After the user has selected a gesture from the list, the list box 402 can be replaced with a gesture movie at 422. Because important user interface (UI) features of object 414 may be displayed under the gesture being performed, instead of a movie showing an opaque hand, a semi-transparent hand 410 can appear over the touch screen, with the object 414 being manipulated appearing under the hand.

Figure 5:
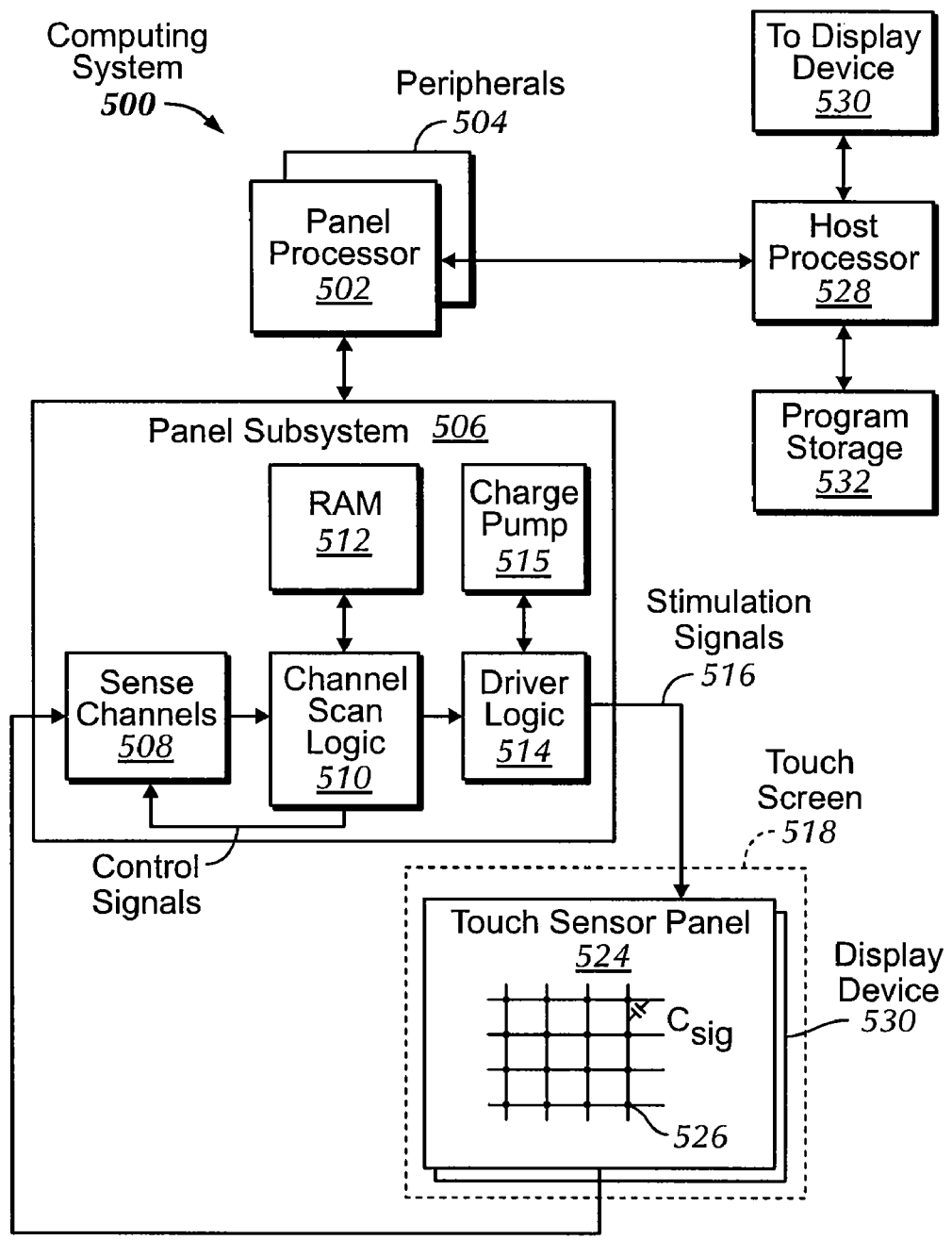
FIG. 5 illustrates an exemplary computing system operable with a touch sensor panel to implement gesture movies and associated features according to one embodiment of this invention.

FIG. 5 illustrates exemplary computing system 500 that can include one or more of the embodiments of the invention described above. Computing system 500 can include one or more panel processors 502 and peripherals 504, and panel subsystem 506. Peripherals 504 can include, but are not limited to, random access memory (RAM) or other types of memory or storage, watchdog timers and the like. Panel subsystem 506 can include, but is not limited to, one or more sense channels 508, channel scan logic 510 and driver logic 514. Channel scan logic 510 can access RAM 512, autonomously read data from the sense channels and provide control for the sense channels. In addition, channel scan logic 510 can control driver logic 514 to generate stimulation signals 516 at various frequencies and phases that can be selectively applied to drive lines of touch sensor panel 524 at a voltage established by charge pump 515. In some embodiments, panel subsystem 506, panel processor 502 and peripherals 504 can be integrated into a single application specific integrated circuit (ASIC).

Touch sensor panel 524 can include a capacitive sensing medium having a plurality of drive lines and a plurality of sense lines, although other sensing media can also be used. Each intersection, adjacency or near-adjacency of drive and sense lines can represent a capacitive sensing node and can be viewed as picture element (pixel) 526, which can be particularly useful when touch sensor panel 524 is viewed as capturing an "image" of touch. (In other words, after panel subsystem 506 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 524 can drive sense channel 508 (also referred to herein as an event detection and demodulation circuit) in panel subsystem 506.

Computing system 500 can also include host processor 528 for receiving outputs from panel processor 502 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 528 can also perform additional functions that may not be related to panel processing, and can be coupled to program storage 532 and display device 530 such as an LCD display for providing a UI to a user of the device. Display device 530 together with touch sensor panel 524, when located partially or entirely under the touch sensor panel, or partially or entirely integrated with the touch sensor panel, can form touch screen 518.

Note that one or more of the functions described above can be performed by firmware stored in memory (e.g. one of the peripherals 504 in FIG. 5) and executed by panel processor 502, or stored in program storage 532 and executed by host processor 528. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any storage medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 6A:
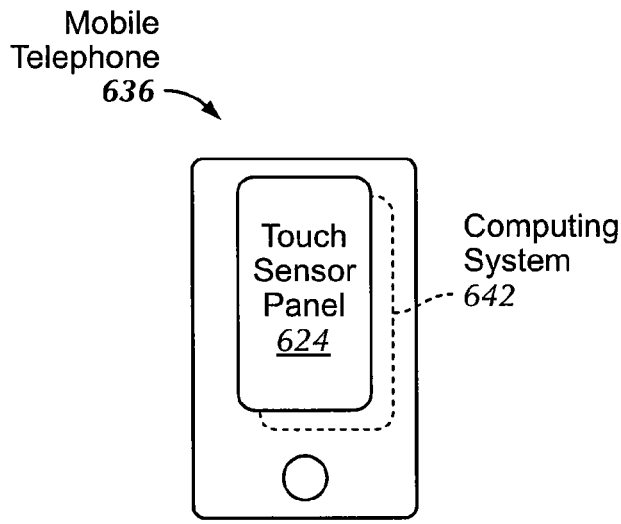
FIG. 6a illustrates an exemplary mobile telephone that can include a touch sensor panel and computing system for implementing gesture movies and associated features according to one embodiment of this invention.
Figure 6B:
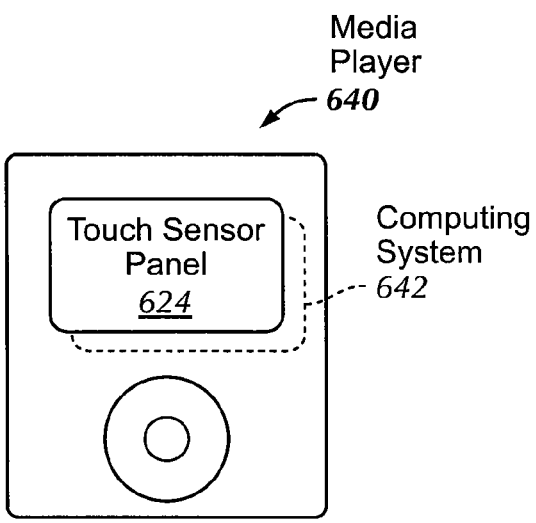
FIG. 6b illustrates an exemplary digital media player that can include a touch sensor panel and computing system for implementing gesture movies and associated features according to one embodiment of this invention.
Figure 6C:
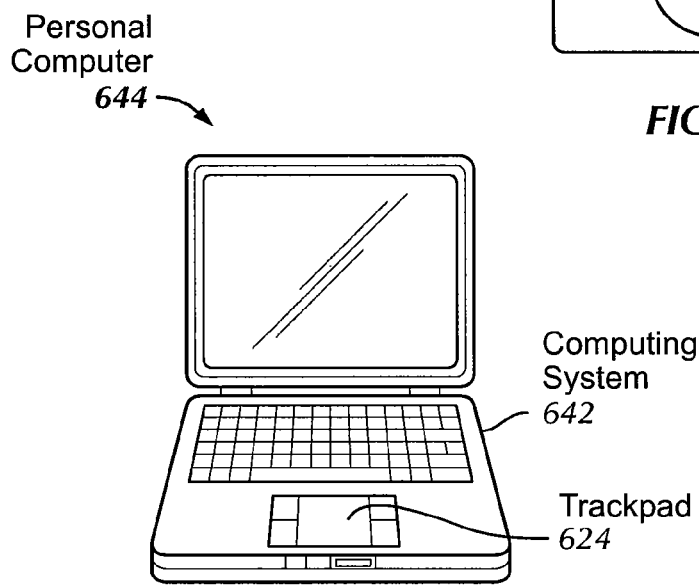
FIG. 6c illustrates an exemplary personal computer that can include a touch sensor panel and computing system for implementing gesture movies and associated features according to one embodiment of this invention.

FIG. 6a illustrates exemplary mobile telephone 636 that can include touch sensor panel 624 and computing system 642 for implementing gesture movies and associated features described above according to embodiments of the invention. FIG. 6b illustrates exemplary digital media player 640 that can include touch sensor panel 624 and computing system 642 for implementing gesture movies and associated features described above according to embodiments of the invention. FIG. 6c illustrates exemplary personal computer 644 that can include touch sensor panel (e.g. trackpad) 624 and computing system 642 for implementing gesture movies and associated features described above according to embodiments of the invention. The mobile telephone, media player, and personal computer of FIGS. 6a, 6b and 6c can advantageously benefit from the gesture movies and associated features described above because users can easily learn or recall gestures that can be performed on those devices.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of demonstrating a gesture for manipulating a user input device, comprising:
   detecting a user input on the user input device, the user input being an initial portion of each of one or more gestures of the input device;
   displaying a menu of the one or more gestures;
   detecting a user selection of one of the one or more gestures from the menu;
   initiating a movie of the selected gesture, wherein initiating a gesture movie includes displaying a first movie of the gesture being performed; and
   displaying a second movie, synchronous with the first, in which an effect upon one or more objects of a gesture that manipulates a user input device is shown, the effect occurring synchronous with the performance of the gesture in the first movie.

2. The method of claim 1, wherein displaying a menu of the one or more gestures includes displaying a list box of gestures that can be selected for demonstration.

3. The method of claim 1, wherein detecting a user input on the user input device further includes detection of one or more contacts on a touch sensor panel having movement below a certain threshold for a predetermined amount of time.

4. The method of claim 1, further comprising displaying the one or more effects as a function of a context in which the demonstration was initiated.

5. The method of claim 1, further comprising displaying a hand performing the gesture as either a right or left hand based upon a pattern of one or more contacts detected on a touch sensor panel.

6. The method of claim 1, further comprising providing audio or visual feedback when the gesture causes a touch upon a touch sensor panel.

7. The method of claim 1, further comprising cycling through demonstrations of each of a set of gestures.

8. The method of claim 1, wherein the movie is a video of the gesture being performed by a hand on or over a touch sensor panel.

9. The method of claim 1, wherein the movie is an animation of the gesture being performed by a hand on or over a touch sensor panel.

10. The method of claim 9, the animation comprising:
    displaying the hand using a transparent or semi-transparent representation of the hand; and
    displaying expected contact points with the touch sensor panel under the transparent or semi-transparent representation of the hand.

11. The method of claim 10, further comprising fading the transparent or semi-transparent representation of the hand over time so that only the expected contact points remain over the touch sensor panel.

12. The method of claim 9, the animation of the gesture comprising displaying animated arrows indicating expected movements of the hand to perform the gesture.

13. The method of claim 12, wherein the animated arrows can appear, disappear, move, grow, shrink, blink, or change color.

14. The method of claim 1, wherein displaying a menu of the one or more gestures includes:
    displaying a first bubble on the gesture selection panel representing the detected contacts;
    displaying a plurality of second bubbles on the gesture selection panel representing possible gestures to be demonstrated; and
    wherein detecting a user selection of one of the one or more gestures from the menu includes moving the first bubble against a particular second bubble to select the gesture associated with the particular second bubble to be demonstrated.

15. The method of claim 1, wherein displaying a menu of the one or more gestures includes:
    displaying a first bubble on the gesture selection panel representing the detected contacts;
    displaying a virtual gesture movie control ring on the gesture selection panel around the first bubble, the virtual gesture movie control ring indicating one or more possible gestures to be demonstrated; and
    wherein detecting a user selection of one of the one or more gestures from the menu includes rotating the first bubble to select a gesture to be demonstrated.

16. The method of claim 1, wherein the first movie is superimposed over the second movie in a single viewing area.

17. A non-transitory computer-readable storage medium storing program code for demonstrating a gesture that manipulates a user input device, the program code for causing performance of a method comprising:
    detecting a user input on the user input device, the user input being an initial portion of each of one or more gestures of the input device;
    displaying a menu of the one or more gestures;
    detecting a user selection of one of the one or more gestures from the menu;
    initiating a movie of the selected gesture, wherein initiating a movie includes providing a first visual representation of the gesture being performed along with a second visual representation in which an effect upon one or more objects of a gesture that manipulates a user input device is shown, the effect occurring synchronous with the performance of the gesture in the first visual representation, the one or more objects being representative of the types of objects that can be manipulated by the gesture.

18. The non-transitory computer-readable storage medium of claim 17, the program code wherein displaying a menu of the one or more gestures includes displaying a list box of gestures that can be selected for demonstration.

19. The non-transitory computer-readable storage medium of claim 17, the program code further for causing performance of a method comprising displaying the one or more effects as a function of a context in which the demonstration was initiated.

20. The non-transitory computer-readable storage medium of claim 17, the program code further for causing performance of a method comprising displaying a hand performing the gesture as either a right or left hand based upon a pattern of one or more contacts detected on a touch sensor panel.

21. The non-transitory computer-readable storage medium of claim 17, the program code further for causing performance of a method comprising providing audio or visual feedback when the gesture causes a touch upon a touch sensor panel.

22. The non-transitory computer-readable storage medium of claim 17, the program code further for causing performance of a method comprising cycling through demonstrations of each of a set of gestures.

23. The non-transitory computer-readable storage medium of claim 17, the program code further for causing performance of a method comprising:
presenting the visual representation as an animation of the gesture being performed by a hand on or over a touch sensor panel;
displaying the hand using a transparent or semi-transparent representation of the hand;
displaying expected contact points with the touch sensor panel under the transparent or semi-transparent representation of the hand; and
fading the transparent or semi-transparent representation of the hand over time so that only the expected contact points remain over the touch sensor panel.

24. The non-transitory computer-readable storage medium of claim 17, wherein displaying a menu of the one or more gestures includes:
displaying a first bubble on the gesture selection panel representing the detected contacts;
displaying a plurality of second bubbles on the gesture selection panel representing possible gestures to be demonstrated; and
wherein detecting a user selection of one of the one or more gestures from the menu includes moving the first bubble against a particular second bubble to select the gesture associated with the particular second bubble to be demonstrated.

25. The non-transitory computer-readable storage medium of claim 17, wherein displaying a menu of the one or more gestures includes:
displaying a first bubble on the gesture selection panel representing the detected contacts;
displaying a virtual gesture movie control ring on the gesture selection panel around the first bubble, the virtual gesture movie control ring indicating one or more possible gestures to be demonstrated; and
wherein detecting a user selection of one of the one or more gestures from the menu includes rotating the first bubble to select a gesture to be demonstrated.

26. A mobile telephone including a non-transitory computer-readable storage medium storing program code for demonstrating a gesture that manipulates a user input device, the program code for causing performance of a method comprising:
detecting a user input on the user input device, the user input being an initial portion of each of one or more gestures of the input device;
displaying a menu of the one or more gestures;
detecting a user selection of one of the one or more gestures from the menu;
initiating a movie of the selected gesture, wherein initiating a movie includes providing a first visual representation of the gesture being performed along with a second visual representation in which an effect upon one or more objects of a gesture that manipulates a user input device is shown, the effect occurring synchronous with the performance of the gesture in the first visual representation, the one or more objects being representative of the types of objects that can be manipulated by the gesture.

27. A media player including a non-transitory computer-readable storage medium storing program code for demonstrating a gesture that manipulates a user input device, the program code for causing performance of a method comprising:
detecting a user input on the user input device, the user input being an initial portion of each of one or more gestures of the input device;
displaying a menu of the one or more gestures;
detecting a user selection of one of the one or more gestures from the menu;
initiating a movie of the selected gesture, wherein initiating a movie includes providing a first visual representation of the gesture being performed along with a second visual representation in which an effect upon one or more objects of a gesture that manipulates a user input device is shown, the effect occurring synchronous with the performance of the gesture in the first visual representation, the one or more objects being representative of the types of objects that can be manipulated by the gesture.

28. A personal computer including a non-transitory computer-readable storage medium storing program code for demonstrating a gesture that manipulates a user input device, the program code for causing performance of a method comprising:
detecting a user input on the user input device, the user input being an initial portion of each of one or more gestures of the input device;
displaying a menu of the one or more gestures;
detecting a user selection of one of the one or more gestures from the menu;
initiating a movie of the selected gesture, wherein initiating a movie includes providing a first visual representation of the gesture being performed along with a second visual representation in which an effect upon one or more objects of a gesture that manipulates a user input device is shown, the effect occurring synchronous with the performance of the gesture in the first visual representation, the one or more objects being representative of the types of objects that can be manipulated by the gesture.

* * * * *